United States Patent
Fukumoto et al.

(10) Patent No.: US 7,575,606 B2
(45) Date of Patent: Aug. 18, 2009

(54) METHOD FOR PRODUCING LITHIUM ION SECONDARY BATTERY

(75) Inventors: Yusuke Fukumoto, Moriguchi (JP); Tsumoru Ohata, Kyoto (JP); Tetsuya Hayashi, Kadoma (JP)

(73) Assignee: Panasonic Corporation, Osaka (JP)

(*) Notice: Subject to any disclaimer, the term of this patent is extended or adjusted under 35 U.S.C. 154(b) by 280 days.

(21) Appl. No.: 10/550,149

(22) PCT Filed: Feb. 17, 2005

(86) PCT No.: PCT/JP2005/002407

§ 371 (c)(1), (2), (4) Date: Sep. 21, 2005

(87) PCT Pub. No.: WO2005/081336

PCT Pub. Date: Sep. 1, 2005

(65) Prior Publication Data

US 2006/0248710 A1 Nov. 9, 2006

(30) Foreign Application Priority Data

Feb. 20, 2004 (JP) ............................. 2004-044290

(51) Int. Cl.
*H01M 10/04* (2006.01)
(52) U.S. Cl. .................... 29/623.1; 429/623.5
(58) Field of Classification Search ............. 29/623.1, 29/623.5
See application file for complete search history.

(56) References Cited

U.S. PATENT DOCUMENTS 5,654,114 A * 8/1997 Kubota et al. ............... 429/338
6,090,506 A   7/2000 Inoue et al.
6,423,446 B1 * 7/2002 Miyazaki et al. ............ 429/209

(Continued)

FOREIGN PATENT DOCUMENTS

JP       7-220759 A       8/1995

(Continued)

OTHER PUBLICATIONS

European Search Report issued in European Patent Application No. EP 05 71 9209, mailed Aug. 23, 2007.

*Primary Examiner*—Patrick Ryan
*Assistant Examiner*—Angela J. Martin
(74) *Attorney, Agent, or Firm*—McDermott Will & Emery LLP

(57) ABSTRACT

A method for producing lithium ion secondary batteries includes the steps of: (A) preparing an electrode sheet with lead-forming parts, (B) intermittently forming porous insulating layers containing an inorganic oxide filler and a binder on a surface of the electrode sheet excluding the lead-forming parts, (C) connecting a lead to each of the lead-forming parts, and (D) fabricating batteries by using the electrode sheet to which the leads are connected. The step B includes: the step of applying a slurry containing the inorganic oxide filler and the binder to the outer surface of a gravure roll, and transferring the slurry applied to the outer surface of the gravure roll on a surface of the electrode sheet that is being transported by a plurality of guide rolls excluding the lead-forming part; and the step of moving at least one selected from the gravure roll and the guide rolls to make the electrode sheet away from the gravure roll in the lead-forming part.

9 Claims, 1 Drawing Sheet

U.S. PATENT DOCUMENTS

2004/0115117 A1    6/2004  Takei et al.
2007/0072083 A1 *  3/2007  Ikuta et al. .................. 429/246

FOREIGN PATENT DOCUMENTS

| | | | |
|---|---|---|---|
| JP | 08-229481 | * | 9/1996 |
| JP | 8-229481 A | | 9/1996 |
| JP | 9-298058 A | | 11/1997 |
| JP | 10-97874 A | | 4/1998 |
| JP | 10-247490 A | | 9/1998 |
| JP | 11-317218 | * | 11/1999 |
| JP | 11-317218 A | | 11/1999 |
| JP | 2001-179151 | * | 7/2001 |
| JP | 2001-179151 A | | 7/2001 |
| JP | 2002-0016357 | | 3/2002 |
| JP | 2002-222650 A | | 8/2002 |
| KR | 2002-0016357 | * | 3/2002 |

* cited by examiner

METHOD FOR PRODUCING LITHIUM ION SECONDARY BATTERY

RELATED APPLICATION

This application is the U.S. National Phase under 35 U.S.C. § 371 of International Application No. PCT/JP2005/002407, filed Feb. 17, 2005, which in turn claims the benefit of Japanese Application No. 2004-044290, filed Feb. 20, 2004, the disclosures of which Applications are incorporated by reference herein in their entirety.

TECHNICAL FIELD

The present invention relates to a method for producing lithium ion secondary batteries with improved safety against short-circuits, and more specifically, to an effective method for intermittently forming porous insulating layers on a surface of an electrode sheet.

BACKGROUND ART

Lithium ion secondary batteries have a separator between the positive electrode and the negative electrode, the separator having the functions of electrically insulating these electrode plates and further holding an electrolyte. The separator for lithium ion secondary batteries is currently made of a microporous thin film sheet composed mainly of polyethylene. When such a thin film sheet is used, an internal short-circuit may occur, since an active material that has fallen off from electrode plates in a manufacturing process of a battery or foreign matter included in the battery may penetrate the thin film sheet.

In order to prevent the occurrence of internal short-circuits in lithium ion secondary batteries, and as an effective means for preventing the expansion of short-circuiting, there has been a proposal to form a protective film (porous insulating layer) containing insulating particles (inorganic oxide filler), such as alumina powder, and a resin binder on the surface of the positive electrode or the negative electrode (Japanese Patent Publication No. 3371301). The porous insulating layer is usually formed by applying a slurry containing an inorganic oxide filler and a resin binder on the electrode surface and drying it.

Generally, the electrode for lithium ion secondary batteries is formed of an electrode plate in sheet form. Such an electrode sheet comprises an electrode core member and an electrode material mixture carried on each side of the electrode core member. The electrode sheet needs to have a lead-forming part for connecting a current-collecting lead. As the lead-forming part, an exposed part of the electrode core member (current collector), i.e., a part having no electrode material mixture applied thereon, is usually utilized. It is common from the structural requirements of the battery that there is a location displacement between the part having no electrode material mixture applied thereon on one side of the electrode core member and the part having no electrode material mixture applied thereon on the other side thereof.

A typical method for applying an electrode material mixture to an electrode core member is a method of intermittently applying a paste containing an electrode material mixture to an electrode core member using a die coater (Japanese Patent Publication No. 2842347). There has also been proposed a method of applying a paste containing an electrode material mixture to an electrode core member by means of a gravure roll without forming a part having no electrode material mixture applied thereon (Japanese Laid-Open Patent Publication No. 2001-179151). However, this method requires peeling a part of the electrode material mixture off the core member in order to form a part having no electrode material mixture applied thereon. There has also been proposed a method in which a part of an electrode core member is masked with tape, a paste containing an electrode material mixture is applied to the electrode core member, and thereafter the tape is peeled off. Further, there has also been proposed a method in which a part having no electrode material mixture applied thereon is formed by clotting a part of an electrode material mixture applied to an electrode core member and then peeling it off (Japanese Laid-Open Patent Publication No. Hei 10-247490).

DISCLOSURE OF INVENTION

Problem that the Invention is to Solve

In the case of forming a porous insulating layer by applying a slurry containing an inorganic oxide filler and a resin binder to a surface of an electrode sheet and drying it, the same method is also employed as that employed when a paste containing an electrode material mixture is applied to an electrode core member. However, when a porous insulating layer is formed on the surface of an electrode sheet having a lead-forming part, the following problems arise.

First, when a slurry is intermittently applied to a surface of an electrode sheet by means of a die coater, in principle, the existence of the part having no electrode material mixture applied thereon causes a change in the distance between the slit die and the surface of the electrode sheet. As a result, the slurry cannot be applied in uniform thickness to the surface of the electrode sheet. Specifically, the slurry is not sufficiently applied, so that the underlying electrode material mixture is exposed in streaks and the porous insulating layer becomes uneven. Such an uneven porous insulating layer cannot perform its essential function, and in addition, it allows charge and discharge reactions to proceed unevenly, thereby becoming a cause of cycle life degradation.

Also, in the field of gravure printing using a gravure roll, since there is no concept of intermittent application, a slurry containing an inorganic oxide filler and a resin binder is applied to the part having no electrode material mixture applied thereon. Hence, a step of peeling the slurry applied to the lead-forming part becomes necessary. However, such peeling step not only reduces production yields but also causes a problem of residues of insulating material on the peeled surface. In the case of peeling a paste containing an electrode material mixture applied to an electrode core member, even if the material mixture is left on the lead-forming part, degradation of battery characteristics hardly occurs, since the electrode material mixture itself is conductive. However, if the inorganic oxide filler or the resin binder is left on the lead-forming part, the contact resistance between the lead and the electrode core member increases, thereby resulting in degradation of battery characteristics.

Further, in the case of masking the lead-forming part with tape in advance, a masking step and a tape-peeling step become necessary, thereby leading to a significant reduction in production yields.

Under such circumstances, the present invention proposes an effective method of intermittently forming porous insulating layers containing an inorganic oxide filler and a binder on a surface of an electrode sheet excluding lead-forming parts by using a gravure roll.

Means for Solving the Problem

The present invention relates to a method for producing lithium ion secondary batteries, including the steps of: (A) preparing an electrode sheet with lead-forming parts, (B) intermittently forming porous insulating layers comprising an inorganic oxide filler and a binder on a surface of the electrode sheet excluding the lead-forming parts, (C) connecting a lead to each of the lead-forming parts, and (D) fabricating batteries by using the electrode sheet to which the leads are connected. The step B includes: the step of applying a slurry comprising the inorganic oxide filler and the binder to the outer surface of a gravure roll, and transferring the slurry applied to the outer surface of the gravure roll on a surface of the electrode sheet that is being transported by a plurality of guide rolls excluding the lead-forming part; and the step of moving at least one selected from the gravure roll and the guide rolls to make the electrode sheet away from the gravure roll in the lead-forming part.

The step A preferably includes the step of applying a paste comprising an electrode material mixture to the outer surface of a gravure roll, and transferring the paste applied to the outer surface of the gravure roll on a surface of an electrode core member that is being transported by a plurality of guide rolls.

At least a part of the outer surface of the gravure roll used in the step (A) and/or the step (B) is preferably covered with ceramic.

In the step A, a part of the paste applied to the outer surface of the gravure roll is preferably scraped off by a blade without being transferred to the surface of the electrode core member. Also, in the step B, a part of the slurry applied to the outer surface of the gravure roll is preferably scraped off by a blade without being transferred to the surface of the electrode sheet.

In the step (A) and/or the step (B), the traveling direction of the outer surface of the gravure roll is preferably opposite to the traveling direction of the electrode core member or the electrode sheet.

EFFECTS OF THE INVENTION

According to the present invention, porous insulating layers comprising an inorganic oxide filler and a binder can be intermittently formed in uniform thickness on a surface of an electrode sheet having lead-forming parts. It is usually difficult to form porous insulating layers in uniform thickness on an electrode sheet having lead-forming parts (parts having no electrode material mixture applied thereon).

Also, according to the present invention, the contact resistance between a lead and an electrode core member in the lead-forming part does not become large. Further, since the porous insulating layer has a uniform thickness, its functions of preventing short-circuits and expansion of short-circuiting are enhanced, and the charge and discharge reactions proceed uniformly. As a result, it is possible to provide a lithium ion secondary battery with excellent cycle characteristics.

BEST MODE FOR CARRYING OUT THE INVENTION

Figure 1:
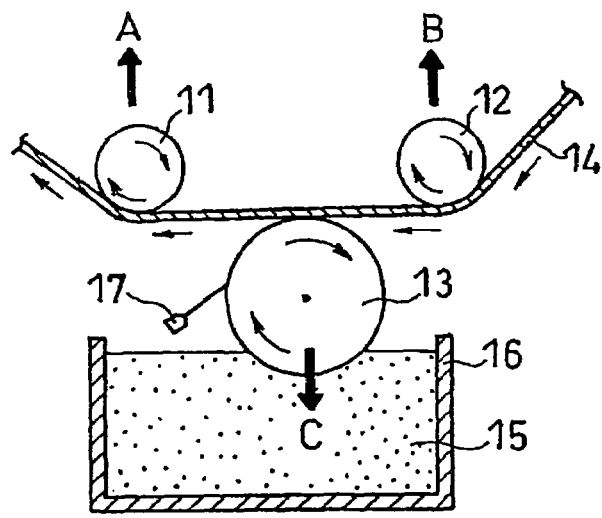
FIG. 1 is a schematic sectional view showing an exemplary application device with a gravure roll.

Referring now to FIG. 1, an exemplary method for producing a lithium ion secondary battery of the present invention is described.

First, the step A of producing an electrode sheet with lead-forming parts is described. An electrode sheet is obtained by placing an electrode material mixture on both sides of an electrode core member. Specifically, a paste containing an electrode material mixture is applied to an electrode core member and then dried, whereby the electrode material mixture can be carried on the electrode core member.

The paste containing an electrode material mixture can be obtained by dispersing an electrode material mixture in a liquid component. The electrode material mixture comprises an active material as an essential component and contains a binder, a conductive agent, etc., as optional components. As the liquid component, an appropriate one is selected depending on the composition of the electrode material mixture. For example, an electrode material mixture comprising a carbon material as an active material is preferably dispersed in water, N-methyl-2-pyrrolidone, cyclohexanone, or the like. An electrode material mixture comprising a lithium-containing composite oxide as an active material is preferably dispersed in N-methyl-2-pyrrolidone, cyclohexanone, or the like.

The method by which the paste containing an electrode material mixture is applied to the surface of the electrode core member is not to be particularly limited, but it is preferred to intermittently apply the paste containing an electrode material mixture on both sides of the electrode core member excluding lead-forming parts. For example, a method of intermittently applying the paste to the electrode core member by means of a die coater is commonly employed. Also, after the masking of the lead-forming parts of the electrode core member with tape, the paste containing an electrode material mixture may be applied to the electrode core member, followed by removal of the tape.

Also, the paste containing an electrode material mixture may be applied to the outer surface of a gravure roll, the paste applied to the outer surface of the gravure roll may be transferred to a surface of an electrode core member that is being transported by a plurality of guide rolls, and parts of the electrode material mixture may be peeled from the core member in order to form lead-forming parts. Even if a small amount of the electrode material mixture is left on the electrode core member, there is no particular problem, since the electrode material mixture is conductive.

Next, the step B of intermittently forming porous insulating layers comprising an inorganic oxide filler and a binder on a surface of the electrode sheet excluding the lead-forming parts is described.

The porous insulating layers are obtained by applying a slurry containing an inorganic oxide filler and a binder on the surface of the electrode sheet excluding the lead-forming parts by means of an application device including a gravure roll and drying it.

The slurry containing an inorganic oxide filler and a binder can be obtained by dispersing an inorganic oxide filler and a binder in a liquid component. As the liquid component, an appropriate one is selected depending on the kind of the inorganic oxide filler and the binder, and water, N-methyl-2-pyrrolidone, cyclohexanone, etc., can be used preferably.

FIG. 1 is a schematic sectional view showing an exemplary application device including a gravure roll. This application device is equipped with a first guide roll 11 and a second guide roll 12 that are disposed in parallel at a certain interval, and a gravure roll 13 that is disposed below the guide rolls 11 and 12 and between the guide rolls 11 and 12. The whole outer surface of the gravure roll 13 has a gravure pattern engraved thereon. The gravure pattern and the radius of the gravure roll are not to be particularly limited. The first guide roll 11 and the second guide roll 12 perform the function of transporting an electrode sheet 14 in one direction. In FIG. 1, two guide rolls are used, but the number of guide rolls is not to be particularly limited.

Under the gravure roll 13 is a slurry vessel 16 filled with a slurry 15 containing an inorganic oxide filler and a binder. The lower outer surface of the gravure roll 13 is positioned below the liquid level of the slurry 15. When the gravure roll 13 rotates, the slurry 15 is applied to the outer surface of the gravure roll 13, and a part of the slurry 15 is scraped off by a blade 17. The blade 17 is preferably composed of a resin such as polystyrene, polyethylene, or polypropylene.

The slurry left on the outer surface of the gravure roll 13 is then transferred to the lower surface of the electrode sheet 14 that is being transported by the guide rolls 11 and 12. In FIG. 1, when the electrode sheet 14 passes through the midpoint between the first guide roll 11 and the second guide roll 12, the lower surface of the electrode sheet 14 comes into contact with the upper outer surface of the gravure roll 13, but the positional relation between the electrode sheet 14 and the gravure roll 13 is not to be particularly limited.

For the lead-forming parts, the operation of making the electrode sheet away from the gravure roll is performed by moving at least one selected from the gravure roll and the guide rolls. For example, the electrode sheet 14 can be made away from the gravure roll 13 by moving the first guide roll in the direction of arrow A of FIG. 1, moving the second guide roll in the direction of arrow B, or simultaneously moving the first guide roll and the second guide roll in the directions of arrow A and arrow B. Also, the electrode sheet 14 can be made away from the gravure roll 13 by moving the gravure roll 13 itself in the direction of arrow C of FIG. 1. At the end position of each lead-forming part, the electrode sheet 14 and the gravure roll 13 are brought into contact with each other again.

In the field of conventional gravure printing, the above-mentioned operation of moving the guide roll or gravure roll upward or downward is not performed during application. This is because a predetermined pattern is usually formed on the outer surface of a gravure roll in order to provide a film having a pattern.

While the above-mentioned operation may be performed manually, it is preferred to use a computer for control. If a computer is used for control, it is preferred to constantly monitor the surface of the electrode sheet. At the instant when the beginning position of each lead-forming part reaches the contact point between the gravure roll and the electrode sheet, the guide roll(s) and/or the gravure roll are/is moved upward or downward to make the electrode sheet away from the gravure roll. At the instant when the end position of each lead-forming part reaches the position at which it is to contact the gravure roll, the guide roll(s) and/or the gravure roll are/is moved back to the original position.

It is preferred that at least a part of the outer surface of the gravure roll, preferably the whole surface thereon, be covered with ceramic. By covering the outer surface of the roll with ceramic, the wear of the roll can be prevented, and in addition, the inclusion of foreign matter, such as metal, into the applied film of slurry or paste and a decrease in the thickness accuracy of the applied film can be prevented. As a result, the life of the application device is improved. The material of the ceramic is preferably aluminum oxide (alumina), chromium oxide (chromia), or the like, since they produce a large effect in preventing roll wear.

In terms of uniform application of slurry or paste to the surface of the electrode sheet or electrode core member, it is preferred that the traveling direction of the outer surface of the gravure roll be opposite to the traveling direction of the electrode sheet or electrode core member, as illustrated in the arrows of FIG. 1.

The transportation speed of the electrode sheet or electrode core member is not to be particularly limited, but it is preferably 3 to 50 m/min. Also, in terms of uniform application of slurry or paste to the surface of the electrode sheet or electrode core member, it is preferred that the rotation speed of the outer surface of the gravure roll be set to 110 to 250% of the transportation speed of the electrode sheet or electrode core member.

It is preferred that the slurry containing an inorganic oxide filler and a binder be a Newtonian fluid whose viscosity is 10 to 80 mPa·s at 25° C.

Next, the step C of connecting a lead to each of the lead-forming parts and the step D of fabricating a battery by using the electrode sheet to which the lead is connected are described.

The connection method of the lead to each of the lead-forming parts is not to be particularly limited, but welding is commonly performed. Since the inorganic oxide filler and the resin binder contained in the porous insulating layer are not adhering to the lead-forming parts, the welding is done smoothly, and the contact resistance between the lead and the electrode core member also becomes small.

In the present invention, the steps A to C are applicable to the production of positive electrodes or applicable to the production of negative electrodes. Also, the steps A to C are applicable to the production of both positive electrodes and negative electrodes. The porous insulating layer may be formed on the surface of one of the electrodes so as to be interposed between the positive electrode and the negative electrode. When the porous insulating layer has a sufficient thickness, a separator sheet may be unnecessary; however, a separator sheet is usually interposed between the positive electrode and the negative electrode to form an electrode group.

The electrode group is accommodated with a non-aqueous electrolyte in a battery case. Although the lead connected to each electrode is often connected to a predetermined position of the battery case or a sealing plate that seals the battery case, the connecting position depends on the kind of the battery. Thereafter, through a usual predetermined step, the battery is completed.

It should be noted that the step A can also use the same application device as FIG. 1 and perform the same operation as that of the step B, in order to intermittently apply the paste containing an electrode material mixture on both sides of the electrode core member excluding the lead-forming parts. Specifically, the step A can perform the following operation: the paste containing an electrode material mixture is applied to the outer surface of the gravure roll; the applied paste is transferred to a surface of the electrode core member that is being transported by the plurality of guide rolls excluding at least the lead-forming parts; and for the lead-forming parts, the electrode core member is made away from the gravure roll by moving at least one selected from the gravure roll and the guide rolls.

Next, specific structures of lithium ion secondary batteries that can be obtained by the production method of the present invention are described.

The positive electrode sheet includes a positive electrode core member and a positive electrode material mixture carried on both sides of the positive electrode core member. Also, the negative electrode sheet includes a negative electrode core member and a negative electrode material mixture carried on both sides of the negative electrode core member. As the positive electrode core member, for example, aluminum foil or aluminum alloy foil is used preferably, but there is no particular limitation. Also, as the negative electrode core member, for example, copper foil or copper alloy foil is preferably used, but there is no particular limitation.

The positive electrode active material, which is an essential component of the positive electrode material mixture, is not to be particularly limited. However, composite lithium oxides, for example, lithium-containing transition metal oxides, such as lithium cobaltate, lithium nickelate, and lithium manganate, are preferably used. Also preferably used are modified lithium-containing transition metal oxides in which part of the transition metal is replaced with another element. For example, it is preferred that the cobalt contained in lithium cobaltate be replaced with aluminum, magnesium, or the like, and it is preferred that the nickel contained in lithium nickelate be replaced with cobalt, manganese, or the like. These composite lithium oxides may be used singly or in combination with two or more of them.

The negative electrode active material, which is an essential component of the negative electrode material mixture, is not to be particularly limited. However, for example, carbon materials such as natural graphite and artificial graphite, metal materials such as silicon and tin, alloy materials such as silicon alloys and tin alloys, etc., are preferably used. Also usable are vapor-phase growth carbon fibers (VGCF), which have high conductivity but increase the asperities of the electrode surface. These materials may be used singly or in combination with two or more of them.

Preferable examples of the binder, which is an optional component of the positive electrode material mixture or negative electrode material mixture, include fluorocarbon resins such as polytetrafluoroethylene (PTFE) and polyvinylidene fluoride (PVDF), rubber particles such as styrene butadiene rubber (SBR) and modified acrylonitrile rubber (e.g., BM-500B available from Zeon Corporation), and soluble modified acrylonitrile rubber (e.g., BM-720H available from Zeon Corporation). They may be used singly or in combination with two or more of them.

Preferable examples of the thickener, which is an optional component of the positive electrode material mixture or negative electrode material mixture, include carboxymethyl cellulose (CMC) and polyethylene oxide (PEO). Preferable examples of the conductive agent, which is also an optional component, include acetylene black, ketjen black, and various graphites. They may be used singly or in combination with two or more of them. It should be noted that the use of a thickener is particularly preferable when rubber particles are used as the binder.

The resin binder to be contained in the porous insulating layer is not to be particularly limited, but usable examples include polyacrylic acid derivatives, polyacrylonitrile derivatives, polyvinylidene fluoride (PVDF), polyethylene, styrene-butadiene rubber, polytetrafluoroethylene (PTFE), and tetrafluoroethylene-hexafluoropropylene copolymer (FEP).

They may be used singly or in combination with two or more of them. Among them, polyacrylic acid derivatives and polyacrylonitrile derivatives are particularly preferred. It is preferred that these, derivatives contain at least one selected from the group consisting of a methyl acrylate unit, an ethyl acrylate unit, a methyl methacrylate unit, and an ethyl methacrylate unit, in addition to the acrylic acid unit or/and the acrylonitrile unit.

Also, from the viewpoint of enhancing the performance of the negative electrode, most negative electrode material mixtures contain rubber particles such as SBR as a binder and contain a water-soluble resin such as cellulose resin as a thickener. Thus, when the porous insulating layer is formed on the surface of the negative electrode, the resin binder to be contained in the porous insulating layer is preferably water-insoluble. This is to prevent the thickener from swelling in the negative electrode material mixture and to prevent the deformation of the negative electrode and hence the decline in yields.

Also, with respect to the resin binder to be contained in the porous insulating layer, its decomposition-start temperature is preferably 250° C. or higher. This is because in nail penetration tests the temperature due to the heat generated upon an internal short-circuit may locally exceed several hundreds ° C. Also, when the resin binder has a crystal melting point, the crystal melting point is preferably 250° C. or higher.

Usable examples of the inorganic oxide filler include titanium oxide, aluminum oxide, zirconium oxide, tungsten oxide, zinc oxide, magnesium oxide, and silicon oxide. They may be used singly or in combination with two or more of them. Among them, particularly in terms of chemical stability, aluminum oxide (alumina) is preferred, and α-alumina is particularly preferred.

The inorganic oxide filler is not to be particularly limited, and common powder or particulate matter, which comprises primary particles or secondary particles formed of primary particles that agglomerate by van der Waals force, can be used. Also, an inorganic filler containing particles of indefinite shape that comprise a plurality of primary particles (for example, 2 to 10 particles, preferably 3 to 5 particles) that are joined and adhered to one another can be preferably used.

In the porous insulating layer, the ratio of the resin binder to the total of the inorganic oxide filler and the resin binder is not to be particularly limited. The ratio is, for example, 1 to 50% by weight, preferably 1 to 10% by weight, and more preferably 2 to 5% by weight. If the ratio of the resin binder exceeds 50% by weight, it becomes difficult to control the porous structure formed by the gaps between the particles of the inorganic oxide filler. If it is less than 1% by weight, the adhesion of the porous insulating layer to the electrode surface decreases.

When the separator sheet is not used, the thickness of the porous insulating layer is preferably, for example, 1 to 20 μm, and more preferably 3 to 15 μm. Also, when the separator sheet is used, the thickness of the porous insulating layer is preferably 0.5 to 20 μm, and more preferably 2 to 10 μm. Further, the total of the thickness of the separator sheet and the thickness of the porous insulating layer is preferably 15 to 30 μm, and more preferably 18 to 26 μm.

As the separator sheet, a microporous film obtained by molding a resin or resin composition into a sheet form and further drawing the sheet is preferably used. The resin that is a raw material of the separator is not to be particularly limited. Polyolefin resins, for example, polyethylene and polypropylene, are often used, but polyamide, polyethylene terephthalate (PET), polyamide imide, polyimide, and the like are also used. The thickness of the separator sheet is preferably 10 to 25 μm.

As the non-aqueous electrolyte, one comprising a non-aqueous solvent and a lithium salt dissolved therein is preferably used.

The non-aqueous solvent is not to be particularly limited, but usable examples include carbonic acid esters such as ethylene carbonate (EC), propylene carbonate (PC), dimethyl carbonate (DMC), diethyl carbonate (DEC), and ethyl methyl carbonate (EMC); carboxylic acid esters such as γ-butyrolactone, γ-valerolactone, methyl formate, methyl acetate, and methyl propionate; and ethers such as dimethyl ether, diethyl ether, and tetrahydrofuran. These non-aqueous solvents may be used singly or in combination with two or more of them. Among them, particularly carbonic acid ester is preferably used.

The lithium salt is not to be particularly limited, but preferable examples include $LiPF_6$ and $LiBF_4$. They may be used singly or in combination.

In order to ensure stability upon overcharge, it is preferred that the electrolyte preferably contain a small amount of an additive that forms a good film on the positive electrode and/or the negative electrode, for example, vinylene carbonate (VC), vinyl ethylene carbonate (VEC), cyclohexyl benzene (CHB), etc.

The present invention is hereinafter described specifically by ways of Examples, but the present invention is not to be limited to the following Examples.

Comparative Example 1

(i) Positive Electrode Preparation

A positive electrode material mixture paste was prepared by stirring 3 kg of lithium cobaltate with a mean particle size of 3 μm, 1 kg of a solution of polyvinylidene fluoride (#1320 available from Kureha Chemical Industry Co., Ltd.) in N-methyl-2-pyrrolidone (NMP) (solid content: 12% by weight), 90 g of acetylene black, and a suitable amount of NMP with a double-arm kneader.

Using an application device as illustrated in FIG. 1, the positive electrode material mixture paste was applied to both sides of a 15 μm-thick aluminum foil sheet, which was a core member (positive electrode current collector), and was then dried to produce a positive electrode sheet.

The application device used was equipped with a gravure roll having grooves at pitches of 20 lines/inch on the outer surface thereof, the grooves being tilted at 45° C. relative to the rotation axis. The rotation speed of the outer surface of the gravure roll was set to 150% of the transportation speed of the aluminum foil. The traveling direction of the outer surface of the gravure roll was made opposite to the traveling direction of the aluminum foil. The whole outer surface of the gravure roll used was covered with ceramic made of chromium oxide.

The positive electrode sheet was then rolled such that the total thickness was 160 μm. Thereafter, predetermined parts of the rolled positive electrode sheet were sufficiently wiped off with a textile waste moistened with ethanol, to form exposed parts of the core member, which served as lead-forming parts. A positive electrode lead was welded to each of the lead-forming parts.

(ii) Negative Electrode Preparation

A negative electrode material mixture paste was prepared by stirring 3 kg of artificial graphite with a mean particle size of 20 μm, 75 g of a styrene-butadiene copolymer dispersion (BM-400B available from Zeon Corporation)(solid content: 40% by weight), 30 g of carboxymethyl cellulose (CMC), and a suitable amount of water with a double-arm kneader.

Using the same application device as that used for the preparation of the positive electrode sheet, the negative electrode material mixture paste was applied in the same manner to both sides of a 10 μm-thick copper foil sheet, which was a core member (negative electrode current collector), and was then dried to produce a negative electrode sheet.

The negative electrode sheet was then rolled such that the total thickness was 180 μm. Thereafter, predetermined parts of the rolled negative electrode sheet were sufficiently wiped off with a textile waste moistened with ethanol, to form exposed parts of the core member, which served as lead-forming parts. A negative electrode lead was welded to each of the lead-forming parts.

Figure 2:
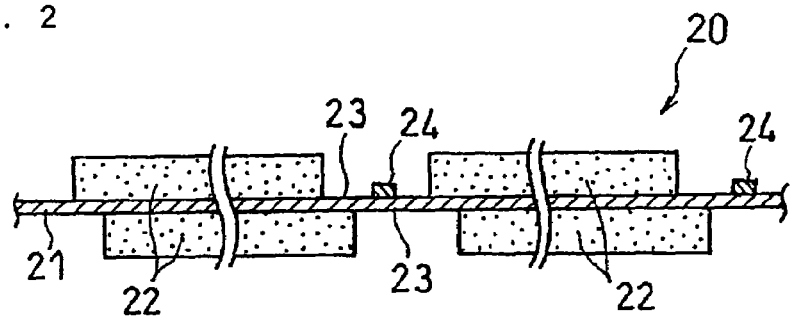
FIG. 2 is a schematic sectional view of a negative electrode sheet according to Comparative Example 1.

FIG. 2 is a schematic sectional view of a negative electrode sheet 20.

Negative electrode material mixtures 22 are carried on both sides of a copper foil sheet 21 serving as a core member. Exposed parts 23 of the core member are formed by peeling the negative electrode material mixtures such that there is a location displacement between one side of the copper foil 21 and the other side thereof. One of the exposed parts 23 of the core member serves as a lead-forming part, to which a lead 24 is welded.

Thereafter, the positive electrode sheet and the negative electrode sheet were cut so as to have a width such that they can be inserted into a cylindrical battery case of size 18650, to obtain a positive electrode and a negative electrode. The positive electrode and the negative electrode were wound, with a separator made of a 20 μm-thick polyethylene microporous film interposed therebetween, to fabricate an electrode group. The electrode group was inserted with a non-aqueous electrolyte into a battery can (battery case).

The electrolyte used was prepared by dissolving $LiPF_6$ at a concentration of 1 mol/L in a solvent mixture of ethylene carbonate (EC), dimethyl carbonate (DMC), and ethyl methyl carbonate (EMC) in a weight ratio of 2:2:5, and 3% by weight of vinylene carbonate (VC) relative to this electrolyte was added thereto. Thereafter, the battery can was sealed, to complete a cylindrical lithium ion secondary battery of size 18650.

Comparative Example 2

A slurry containing an inorganic oxide filler and a resin binder was prepared by stirring 970 g of alumina having a volume basis mean particle size (median diameter) of 0.3 μm, 375 g of a polyacrylonitrile derivative dispersion (BM-720H available from Zeon Corporation)(solid content: 8% by weight), and a suitable amount of NMP with a double-arm kneader.

This slurry was intermittently applied by die coating to one surface of a negative electrode sheet prepared in the same manner as in Comparative Example 1 so as to exclude the lead-forming parts, and it was then dried to form 20 μm-thick porous insulating layers. Likewise, porous insulating layers were then formed on the other surface of the negative electrode sheet. In the die coating, the distance between the die nozzle and the surface of the negative electrode sheet was controlled at approximately 50 μm.

Subsequently, a negative electrode lead was welded to the lead-forming parts. A cylindrical lithium ion secondary battery of size 18650 was completed in the same manner as in Comparative Example 1 except for the use of the negative electrode sheet thus obtained.

Figure 3:
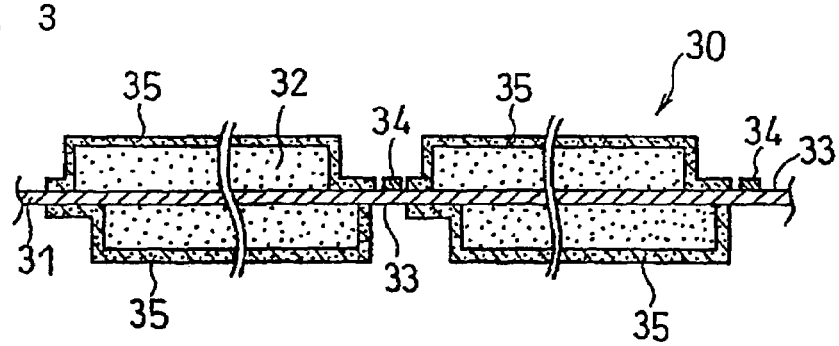
FIG. 3 is a schematic sectional view of a negative electrode sheet according to Comparative Example 2.

FIG. 3 is a schematic sectional view of a negative electrode sheet 30 with porous insulating layers obtained in this comparative example.

Negative electrode material mixtures 32 are carried on both sides of a copper foil sheet 31 serving as a core member. Exposed parts 33 of the core member are formed by peeling the negative electrode material mixtures such that there is a location displacement between one side of the copper foil 31 and the other side thereof. One of the exposed parts 33 of the core member serves as a lead-forming part, to which a lead 34 is welded. Porous insulating layers 35 are formed so as to cover the whole negative electrode material mixtures 32. No porous insulating layer was provided on the backside of the lead-forming part to which the lead 34 was welded for the purpose of ease of lead connection.

Comparative Example 3

Using an application device as illustrated in FIG. 1, the same slurry containing the inorganic oxide filler and the resin binder as that of Comparative Example 2 was continuously applied to one surface of a negative electrode sheet prepared in the same manner as in Comparative Example 1, and it was then dried to form a 20 μm-thick porous insulating layer. Likewise, another porous insulating layer was formed on the other surface of the negative electrode sheet.

The application device used was equipped with a gravure roll having grooves at pitches of 100 lines/inch on the outer surface thereof, the grooves being tilted at 45° C. relative to the rotation axis. The rotation speed of the outer surface of the gravure roll was set to 150% of the transportation speed of the negative electrode sheet. The transportation speed of the negative electrode sheet by the guide rolls was set to 10 m/min. The traveling direction of the outer surface of the gravure roll was made opposite to the traveling direction of the negative electrode sheet. The whole outer surface of the gravure roll used was covered with ceramic made of chromium oxide.

The predetermined parts of the negative electrode sheet having no electrode material mixture were sufficiently wiped off with a textile waste moistened with ethanol, to remove the porous insulating layer. As a result, exposed parts of the core member serving as lead-forming parts were formed.

Subsequently, a negative electrode lead was welded to each of the lead-forming parts. A cylindrical lithium ion secondary battery of size 18650 was completed in the same manner as in Comparative Example 1 except for the use of the negative electrode sheet thus obtained.

Example 1

Using an application device as illustrated in FIG. 1, a slurry containing an inorganic oxide filler and a resin binder prepared in the same manner as in Comparative Example 2 was intermittently applied to one surface of a negative electrode sheet prepared in the same manner as in Comparative Example 1 so as to exclude the lead-forming parts, and it was then dried to form 20 μm-thick porous insulating layers. Likewise, porous insulating layers were formed on the other surface of the negative electrode sheet.

The application device used was equipped with a gravure roll having grooves at pitches of 100 lines/inch on the outer surface thereof, the grooves being tilted at 45° C. The rotation speed of the outer surface of the gravure roll was set to 150% of the transportation speed of the negative electrode sheet. The transportation speed of the negative electrode sheet by the guide rolls was set to 10 m/min. The traveling direction of the outer surface of the gravure roll was made opposite to the traveling direction of the negative electrode sheet. The whole outer surface of the gravure roll used was covered with ceramic made of chromium oxide.

In order to form exposed parts of the core member at the lead-forming parts, the negative electrode sheet was made away from the gravure roll by moving the guide roll upward located forward in the traveling direction of the negative electrode sheet (corresponding to the first guide roll 11 of FIG. 1). The movement of the guide roll was controlled by a computer.

Subsequently, a negative electrode lead was welded to each of the lead-forming parts. The negative electrode sheet with the porous insulating layers obtained in this example has a section that is the same as that of FIG. 3. A cylindrical lithium ion secondary battery of size 18650 was completed in the same manner as in Comparative Example 1 except for the use of the negative electrode sheet thus obtained.

Example 2

In the same manner as in Example 1, a slurry containing an inorganic oxide filler and a resin binder was intermittently applied to one surface of a negative electrode sheet so as to exclude the lead-forming parts, and it was then dried to form 20 μm-thick porous insulating layers. On the other hand, a porous insulating layer was formed on the whole of the other surface of the negative electrode sheet by continuous application.

Subsequently, a negative electrode lead was welded to each of the lead-forming parts. A cylindrical lithium ion secondary battery of size 18650 was completed in the same manner as in Comparative Example 1 except for the use of the negative electrode sheet thus obtained.

Figure 4:
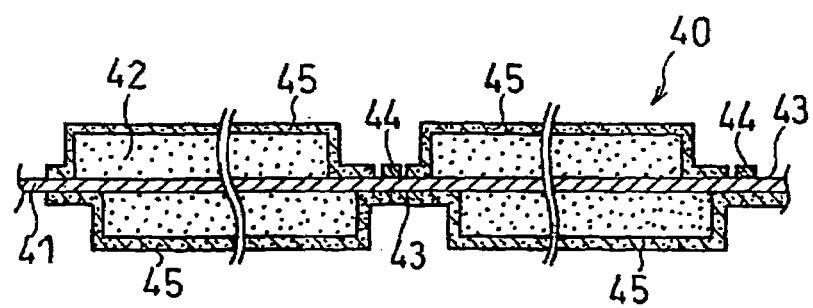
FIG. 4 is a schematic sectional view of a negative electrode sheet according to Example 2.

FIG. 4 is a schematic sectional view of a negative electrode sheet 40 with porous insulating layers obtained in this example.

Negative electrode material mixtures 42 are carried on both sides of a copper foil sheet 41 serving as a core member. Exposed parts 43 of the core member are formed by peeling the negative electrode material mixtures such that there is a location displacement between one side of the copper foil 41 and the other side thereof. One of the exposed parts 43 of the core member serves as a lead-forming part, to which a lead 44 is welded. Porous insulating layers 45 are formed so as to cover the whole negative electrode material mixtures 42. The porous insulating layer is also provided on the backside of the lead-forming part to which the lead 44 was welded.

Example 3

A slurry containing an inorganic oxide filler and a resin binder was intermittently applied to the surfaces of a negative electrode sheet so as to exclude the lead-forming parts and was then dried to form 20 μm-thick porous insulating layers in the same manner as in Example 1, except that the traveling direction of the outer surface of the gravure roll was made same as the traveling direction of the negative electrode sheet.

Subsequently, a negative electrode lead was welded to each of the lead-forming parts. A cylindrical lithium ion secondary battery of size 18650 was completed in the same manner as in Comparative Example 1 except for the use of the negative electrode sheet thus obtained.

[Evaluation]

The batteries of Examples 1 to 3 and Comparative Examples 1 to 3 were evaluated in the following manner. Table 1 shows the result.

(Battery Resistance)

Each battery was subjected to a break-in charge/discharge twice and then measured for its impedance at a measurement frequency of 1 kHz.

(Cycle Capacity Retention Rate)

In an environment of 20° C., each battery was charged and discharged 500 cycles in the following patterns (1) to (3), and the ratio of the discharge capacity at the 500th cycle to the initial capacity was expressed in percentage.

(1) Constant current charge: 1400 mA (cut-off voltage 4.2 V)

(2) Constant voltage charge: 4.2 V (cut-off current 100 mA)

(3) Constant current discharge: 400 mA (cut-off voltage 3V)

(Nail Penetration Test)

In an environment of 20° C., each battery was charged in the following manner.

(1) Constant current charge: 1400 mA (cut-off voltage 4.25 V)

(2) Constant voltage charge: 4.25 v (cut-off current 100 mA)

In an environment of 20° C., a round iron nail of 2.7 mm in diameter was caused to penetrate the charged battery from a side face thereof at a speed of 5 mm/sec. After 1 second, the temperature of the battery near the penetration site was measured.

TABLE 1

|  | Battery resistance | Cycle capacity retention rate (%) | Temperature in nail penetration test (° C.) |
| --- | --- | --- | --- |
| Comparative example 1 | 45 | 92 | 146 |
| Comparative example 2 | 44 | 65 | 83 |
| Comparative example 3 | 55 | 71 | 74 |
| Example 1 | 44 | 91 | 77 |
| Example 2 | 46 | 90 | 75 |
| Example 3 | 45 | 81 | 85 |

[Consideration]

First, in the case of Comparative Example 1 having no porous insulating layer, the temperature after 1 second in the nail penetration test was high, indicating remarkable heating.

Also, in the case of Comparative Example 3, in which after the formation of the porous insulating layer on the whole surface of the negative electrode sheet using the gravure roll, a part of the porous insulating layer was peeled and the lead was then welded to the core member, the temperature in the nail penetration test was lower than that of Comparative Example 1, indicating improved safety; however, the battery resistance was high, and the cycle capacity retention rate was also inferior. When the lead was peeled off the core member and the lead-forming part was analyzed, it was found that some of the inorganic oxide filler could not have been removed and remained between the lead and the core member.

In Comparative Example 2, in which the porous insulating layer was formed by intermittent application by die coating, the temperature in the nail penetration test was high, though not so high as in Comparative Example 1, and the cycle capacity retention rate was also significantly inferior. When the porous insulating layer of Comparative Example 2 was observed, it was found that near the lead-forming part the porous insulating layer was streaked, and that a part of the negative electrode material mixture was exposed without being covered with the porous insulating layer. This is considered to be the reason why the temperature in the nail penetration test increased and the cycle capacity retention rate lowered due to uneven charge and discharge reactions.

On the other hand, in Examples 1 and 2, in which the negative electrode sheet wad made away from the gravure roll to expose the core member in the lead-forming part, the temperature in the nail penetration test is low, and the cycle capacity retention rate is also equivalent to that of Comparative Example 1. This indicates that its safety is sufficiently enhanced by the porous insulating layer, and that the contact resistance between the lead and the core member is maintained low. Also, the production yields of the lithium ion secondary batteries of Examples 1 and 2 were greatly improved. In Example 3, since the evenness of the porous insulating layer was slightly inferior to those of Examples 1 and 2, the temperature in the nail penetration test became a little higher than those of Examples 1 and 2, and the cycle capacity retention rate lowered a little.

INDUSTRIAL APPLICABILITY

The present invention permits effective production of lithium ion secondary batteries in which a porous insulating layer is carried on the surface of an electrode in order to improve the safety against short-circuits. It is effective in intermittently forming porous insulating layers on the surface of an electrode sheet. The present invention is useful as a method for producing lithium ion secondary batteries for use, for example, as the power source for portable power supply devices that are required to have a high degree of safety and high performance.

The invention claimed is:

1. A method for producing lithium ion secondary batteries, comprising the steps of:
    (A) preparing an electrode sheet with lead-forming parts,
    (B) intermittently forming porous insulating layers comprising an inorganic oxide filler and a binder on a surface of said electrode sheet excluding said lead-forming parts,
    (C) connecting a lead to each of said lead-forming parts, and
    (D) fabricating batteries by using the electrode sheet to which said leads are connected,
    wherein said step B comprises:
    a step of applying a slurry comprising the inorganic oxide filler and the binder to the outer surface of a gravure roll, and transferring the slurry applied to the outer surface of said gravure roll onto a surface of said electrode sheet that is being transported by a plurality of guide rolls, excluding said lead-forming parts; and
    a step of moving at least one selected from said gravure roll and said guide rolls to move said electrode sheet away from said gravure roll at said lead-forming parts, wherein
    said gravure roll is disposed between said plurality of guide rolls.

2. The method for producing lithium ion secondary batteries in accordance with claim 1, wherein said step A comprises a step of applying a paste comprising an electrode material mixture to the outer surface of a gravure roll, and transferring the paste applied to the outer surface of said gravure roll onto a surface of an electrode core member that is being transported by a plurality of guide rolls.

3. The method for producing lithium secondary batteries in accordance with claim 1, wherein at least a part of the outer surface of said gravure roll is covered with ceramic.

4. The method for producing lithium secondary batteries in accordance with claim 2, wherein at least a part of the outer surface of said gravure roll of step A and/or step B is covered with ceramic.

5. The method for producing lithium ion secondary batteries in accordance with claim 1, wherein in said step B a part of the slurry applied to the outer surface of said gravure roll is scraped off by a blade without being transferred to the surface of said electrode sheet.

6. The method for producing lithium ion secondary batteries in accordance with claim 2, wherein in said step A a part of the paste applied to the outer surface of said gravure roll is scraped off by a blade without being transferred to the surface of said electrode core member.

7. The method for producing lithium ion secondary batteries in accordance with claim 1, wherein the traveling direction of the outer surface of said gravure roll is opposite to the traveling direction of said electrode sheet.

8. The method for producing lithium ion secondary batteries in accordance with claim 2, wherein in step A and/or step B the traveling direction of the outer surface of said gravure roll is opposite to the traveling direction of said electrode core member.

9. The method for producing lithium ion secondary batteries in accordance with claim 1, wherein said inorganic oxide filler is at least one selected from the group consisting of titanium oxide, aluminum oxide, zirconium oxide, tungsten oxide, zinc oxide, magnesium oxide and silicon oxide.

* * * * *